United States Patent
Morioka

(10) Patent No.: US 6,882,494 B2
(45) Date of Patent: Apr. 19, 2005

(54) SENSOR SYSTEM FOR DISK DEVICE USING FLOATING HEAD

(75) Inventor: Junichiro Morioka, Matsuyama (JP)

(73) Assignee: Matsushita Electric Industrial Co., Ltd. (JP)

( * ) Notice: Subject to any disclaimer, the term of this patent is extended or adjusted under 35 U.S.C. 154(b) by 413 days.

(21) Appl. No.: 10/069,270

(22) PCT Filed: Jun. 25, 2001

(86) PCT No.: PCT/JP01/05431

§ 371 (c)(1),
(2), (4) Date: Feb. 25, 2002

(87) PCT Pub. No.: WO02/01562

PCT Pub. Date: Jan. 3, 2002

(65) Prior Publication Data

US 2002/0122267 A1 Sep. 5, 2002

(30) Foreign Application Priority Data

Jun. 28, 2000 (JP) .................................. 2000-193631

(51) Int. Cl.$^7$ ........................... G11B 21/02; G11B 5/596
(52) U.S. Cl. .................. 360/75; 360/78.12; 360/78.05
(58) Field of Search .............................. 360/75, 25, 31, 360/73.03, 78.12, 78.05; 73/104, 105; 324/212

(56) References Cited

U.S. PATENT DOCUMENTS

| | | | | |
|---|---|---|---|---|
| 4,853,810 A | * | 8/1989 | Pohl et al. ............... | 360/234.7 |
| 4,942,609 A | * | 7/1990 | Meyer ........................ | 360/25 |
| 5,153,785 A | * | 10/1992 | Muranushi et al. ........... | 360/75 |
| 5,637,999 A | * | 6/1997 | Hennecken ................ | 324/212 |
| 5,742,446 A | * | 4/1998 | Tian et al. .................... | 360/75 |
| 5,777,815 A | | 7/1998 | Kasiraj et al. | |
| 5,856,895 A | | 1/1999 | Schaenzer et al. | |
| 6,078,458 A | * | 6/2000 | Fioravanti et al. ....... | 360/73.03 |
| 6,092,412 A | * | 7/2000 | Flechsig et al. .............. | 73/105 |
| 6,351,341 B1 | * | 2/2002 | Lee et al. ..................... | 360/75 |
| 6,476,989 B1 | * | 11/2002 | Chainer et al. ............... | 360/31 |
| 6,568,252 B1 | * | 5/2003 | Boutaghou .................. | 73/104 |
| 6,667,844 B1 | * | 12/2003 | Yao et al. ..................... | 360/75 |

FOREIGN PATENT DOCUMENTS

| | | |
|---|---|---|
| JP | 3-84783 | 4/1991 |
| JP | 3-225686 | 10/1991 |
| JP | 4-137282 | 5/1992 |
| JP | 4-178920 | 6/1992 |
| JP | 7-262726 | 10/1995 |
| JP | 8-63920 | 3/1996 |
| JP | 11-126449 | 5/1999 |

* cited by examiner

Primary Examiner—Sinh Tran
Assistant Examiner—K. Wong
(74) Attorney, Agent, or Firm—Parkhurst & Wendel, L.L.P.

(57) ABSTRACT

A sensor system for a disk device by using a floating head, comprising a head element that floats over a data recording area of a rotating disk so as to write data thereon or read data therefrom, a first actuator for moving the head element over the data recording area of the disk, and a second actuator supported by the first actuator and supporting the head element for precisely positioning the head element against the data recording area of the disk. The sensor system is capable of detecting any contact between the disk and the head element by utilizing a signal generated by the second actuator when the disk contacts the head element during an operation of the disk.

2 Claims, 12 Drawing Sheets

SENSOR SYSTEM FOR DISK DEVICE USING FLOATING HEAD

TECHNICAL FIELD

The invention relates to a sensor system for disk devices using floating heads, in particular, a sensor system for disk devices using floating heads, by utilizing micro-actuators, in the field of disk devices and testing devices in which data are read from or written onto disk-shaped recording media.

BACKGROUND ART

Let us describe the invention using a magnetic disk device as a disk device in question. In order to raise the recording density of a disk, flying height of a head has been reduced year after year and has reached a level of 10 nm or less. In the meantime, the track pitch is also shrinking and has reached a level of 1 μm or less. These trends are causing the following problems:

(1) If physical contact occurs between the head and the disk during a disk operation due to a certain problem, it is necessary to detect the contact and alert the host computer to cause the head to move out of the data area.

(2) In the case of a dynamic loading type magnetic disk device in which the head is moved out of the disk when the disk is not in operation, it is necessary to check if any disturbance exists in the disk device prior to the loading of the head on the disk and to interrupt the loading if any disturbance is found.

(3) As the flying height diminishes to 10 nm or less, it becomes difficult to confirm if the head is truly floating at a designed height on an actual disk device when it is assembled.

(4) Since a disk tester currently available on the market uses a slider that differs in shape from the actual head for a gliding height test for testing the heights of disk surface protrusions, accuracy of measurement is poor. Moreover, since the gliding height test and a confirmation test for checking recording and reproduction characteristics of the disk are carried out on separate heads, a longer testing time is required.

(5) As the track pitch becomes narrower, a servo band needs be increased when the head is following the tracks, which in turn may cause problems such as torsional resonance of a head suspension.

The following proposals have been made for these problems.

As a countermeasure to deal with the contact problem between the head and the disk as described above under (1), U.S. Pat. No. 5,856,895 proposes a method for providing a piezoelectric element on the side of a head slider so that the piezoelectric element oscillates to generate a voltage when a contact occurs between the head and the disk during the disk operation. The method intends to detect the contact between the head and the disk by means of such signal, but a typical slider currently used most widely is so small as 1.2 mm in length, 1 mm in width, and 0.3 mm in height. Therefore, it is difficult to secure a space for mounting a piezoelectric element. U.S. Pat. No. 5,777,815 discloses a method for using a thermal asperity output of a magnetic resistance effect head ("MR head"), however it is only a MR head portion that detects an impact, which is no more than 1 μm in width. Thus, the area of the portion that can be used as a sensor is very small, and moreover, a contact cannot be detected if the contact occurs between the disk and other portions than the MR device on the slider.

As for the problem of (2), Toshiba Technology Disclosure Vol. 17–55, File No. 99169634 disclosed a method for detecting disturbances by adding an acceleration sensor, but the method leads to a cost increase as it requires an additional sensor.

As for the problem of (3), although there is a possibility of measuring the flying height of an assembled actual device by using the thermal asperity output of the magnetic resistance effect head ("MR head") as described in the aforementioned U.S. Pat. No. 5,777,815, a problem exists in that it cannot detect a contact if the contact occurs between the disk and other portions than the MR device, in like manner as in (1).

As for the problem of (4), JP-A-9-259401 discloses a method for using the magnetic distortion effect of an electromagnetic induction type magnetic head but a problem exists in that the detection sensitivity is too low. Also, JP-A-10-27342 discloses a method for measuring a gliding height using the thermal asperity output of the magnetic resistance effect head (MR head), but a problem exists in that it takes more than 10 minutes to check one disk because the width of the MR device is so small as 1 μm.

As for the problem of (5), U.S. Pat. No. 6,005,750 discloses an idea of damping the torsional resonance of the suspension by adding a damper to a load beam of the head suspension. However, the suspension is getting even smaller and shorter these years so that it is difficult to attach a damper due to such space restriction.

DISCLOSURE OF INVENTION

Thus, the present invention intends to solve the foregoing technical problems.

In order to solve the problems, a sensor system according to the present invention comprises: a rotating disk having a data recording area; a head element that floats over the data recording area of the disk so as to write data thereon or read data therefrom; a first actuator for moving the head element over the data recording area of the disk; a second actuator supported by the first actuator and supporting the head element for precisely positioning the head element against the data recording area of the disk; and a means for detecting any contact between the disk and the head element, by utilizing a signal generated by the second actuator when the disk contacts the head element during an operation of the disk.

The problems mentioned above occur due to the fact that there is no proper sensor inside the, disk device for detecting impact and the like. There have been extensive research activities concerning micro-actuators (two stage actuators) for improving truck density. For example, a Japanese magazine "Electronics" describes various types of micro-actuators in its September 1999 issue at pages 44 to 45. It predicts that almost all magnetic disk devices will have micro-actuators in the future. The micro-actuator is basically used for micro-driving a head element by inputting voltage. Whereas the micro-actuator is considered as a kind of converter between electrical energy and mechanical energy. Therefore, a voltage is generated by the micro-actuator when there occurs a mechanical disturbance such as an impact on the head element, if the process of conversion between electrical energy and mechanical energy is reversible. In other words, a micro-actuator can be used as a high sensitivity impact sensor.

A micro-actuator sensor consisting of piezoelectric elements is expected to achieve high conversion efficiency. Moreover, this method is applicable to disk testers and head testers. The present invention is intended to solve the problems (1) through (5) mentioned above, by using the micro-actuator as a high sensitivity sensor temporarily when the micro-actuator is not used for micro-driving the head element.

More specifically, by temporarily employing, as an impact sensor, the micro-actuator for micro-positioning the head, which is indispensable for achieving a high recording density in the future, the present invention makes it possible to detect any contact between the disk and the head element with very high sensitivity without using an additional sensor. Consequently, if a contact between the head and the disk occurs for some reason while the disk is in operation, such contact can be detected, so as to move the head out from the data area and alert the host computer to make a data backup. Thus, a fatal loss of data can be prevented.

According to the invention, the second actuator is preferably disposed on a load beam of a head suspension.

A flying height test method according to the present invention can be implemented by using a sensor system for a disk device having a floating head, wherein a normal rotating speed of a disk during operation is assumed as a first rotating speed; a contact between a disk and a head element is detected by utilizing a signal generated by the second actuator when the disk contacts the head element while the rotating speed of the disk is lowered; the rotating speed of the disk at this time is assumed as a second rotating speed; and a flying height of the head element is measured based on a difference between the first rotating speed and the second rotating speed, under an assumption that a relation between the rotating speed of the disk and the flying height of the head element has already been known.

With such an arrangement, the head flying height of the disk device can be measured directly after completing assembly.

In the sensor system according to the present invention, the head element is retreated from a disk surface by the first actuator when the disk is not in operation, and the system preferably comprises a means for detecting a vibration disturbance by utilizing a signal generated by the second actuator due to this vibration disturbance, before the first actuator starts a loading operation of the head element onto the disk surface from a retreat position.

With this arrangement, it is possible to detect if the disk device is affected by any disturbance before the head is loaded onto the disk, and to stop the loading if there is any disturbance.

The sensor system according to the present invention preferably have a means for applying to the second actuator a signal having a phase opposite to that of a signal generated by the second actuator when the head element is floating, so that a resonance that may occur between the head element and the second actuator can be cancelled.

Thus, even if the load beam of the head suspension is too small and short to be attached with a damper, it is possible to reduce torsional resonance of the suspension without adding a damper or the like.

The sensor system of the invention includes a single plate servo-writer device, and this single plate servo-writer device preferably has a means for detecting any contact between the disk and the head element when the disk is operating, by utilizing signals generated by the second actuator when such contacts occur.

This arrangement allows it to constantly monitor the floating condition of a writing head of the single plate servo-writer device, detect any abnormality of the floating condition caused by some reason, and take necessary countermeasures such as replacement of the writing head when an abnormality occurs.

The sensor system of the invention includes a single plate servo-writer device, and this single plate servo-writer device preferably has a means for applying to the second actuator a signal having a phase opposite to that of a signal generated by the second actuator when the head element is floating, thereby canceling the resonance that occurs between the head element and the second actuator.

Such an arrangement reduces undesirable resonance of the head suspension during operation of the single plate servo-writing device, so that servo-signal writing accuracy can be improved.

The sensor system of the invention comprises a head-testing device preferably having a means for detecting any contact between the disk and the head element when the disk is operating, by utilizing signals generated by the second actuator when such contacts occur.

With such an arrangement, it is possible to detect a protrusion developed in a testing disk in an early stage of its development so that a damage to the to-be-tested head can be prevented and reliability of the test can be improved.

The sensor system according to the present invention includes a disk-testing device, and this disk-testing device preferably has a means for detecting any contact between the disk and the head element while the disk is in operation by utilizing signals generated by the second actuator when such a contact occurs. The testing device can preferably measure a gliding height of the disk by changing the rotating speed of the disk.

With such an arrangement, it is possible to detect a problem occurring to a testing head in an early stage, thereby to prevent a damage to the to-be-tested disk and to improve the reliability of the test. Further, it is possible to measure the gliding height of the disk by changing the rotating speed of the disk as mentioned above, so that it becomes possible to carry out a gliding height test of the disk and a certifying test with a single head in a short time.

BEST MODE FOR CARRYING OUT THE INVENTION

Preferable embodiments of the present invention will be described below using a general magnetic disk drive equipped with a micro-actuator as an example.

(Embodiment 1)

Figure 1:
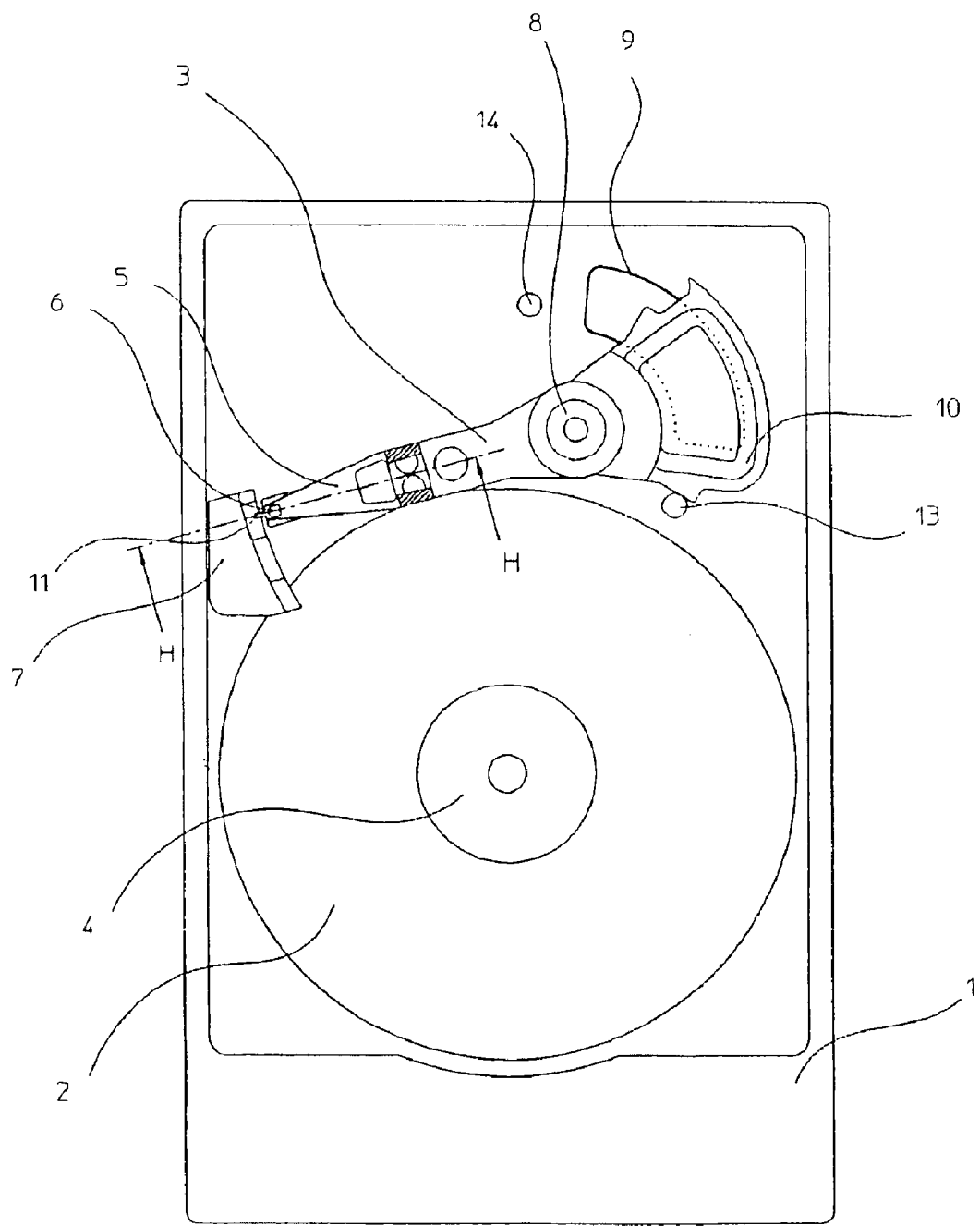
FIG. 1 is a plan view showing a disk device according to a first embodiment of the present invention, when the disk device is not in operation.

FIG. 1 is a plan view of a dynamic loading type magnetic disk device according to the first embodiment of the present invention when it is not in operation. The disk device is equipped with a base 1, a disk 2, and an actuator 3. The disk 2 rotates driven by a spindle motor 4. A suspension 5 is attached to one end of the actuator 3 and the tip 11 of the suspension 5 rests on a rump 7. When it is in operation, the actuator 3 swivels around a pivot shaft 8 driven by the electromagnetic interaction between a magnet 9 and an actuator coil 10. The actuator coil 10 forms a voice coil motor in cooperation with the magnet 9, and this voice coil motor causes the actuator 3 to swivel so as to position a head element 6 on a desired position on the disk 2. Crush stops 13 and 14 are made of cylindrical elastic members, and are fastened on the base 1. The crush stops 13 and 14 are provided at both ends of the swiveling range of the actuator 3 to restrict the swivel range of the actuator 3 and to soften the impact force in a collision.

Figure 2:
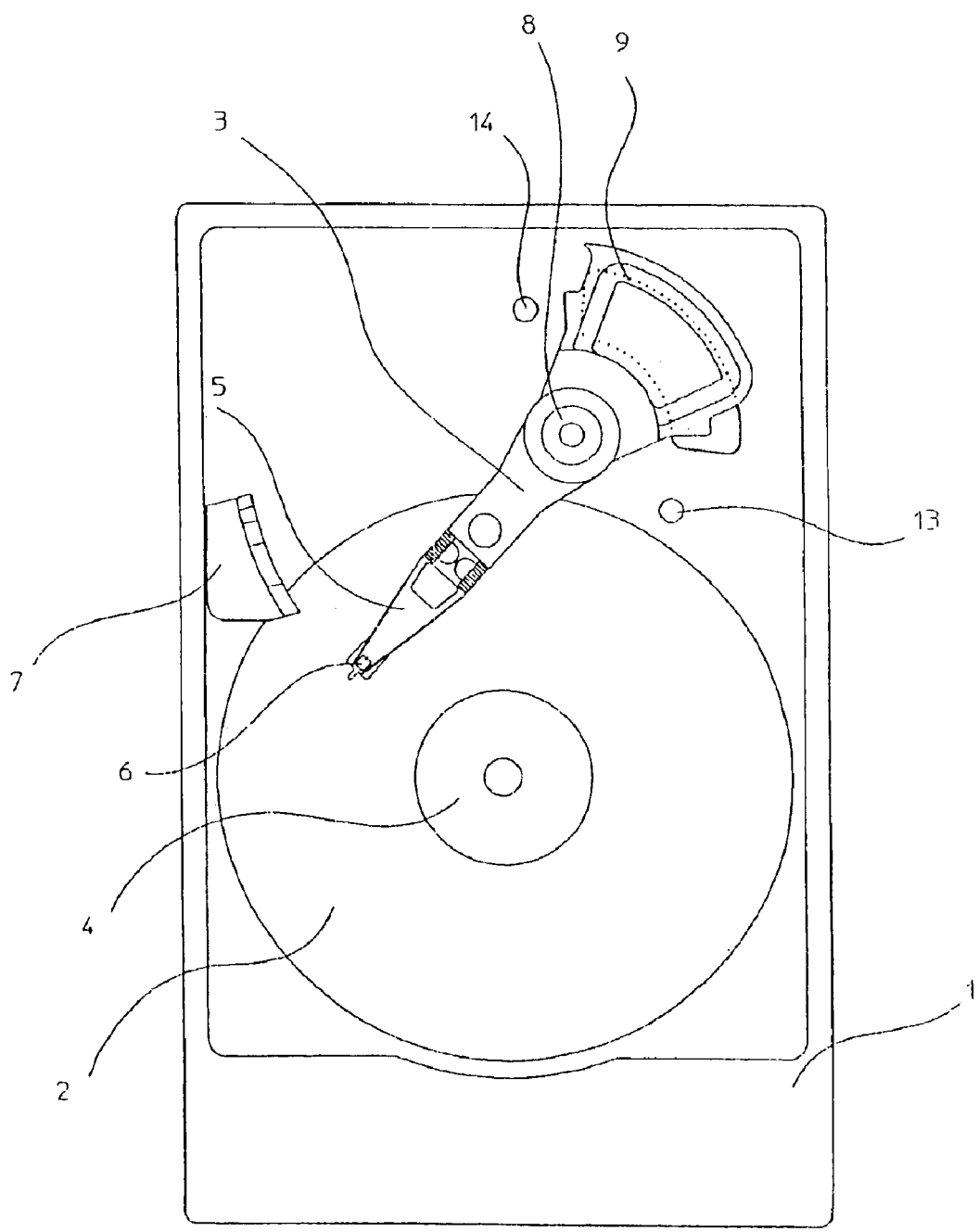
FIG. 2 is a plan view showing the disk device according to the first embodiment of the present invention, when the disk device is in operation.
Figure 3:
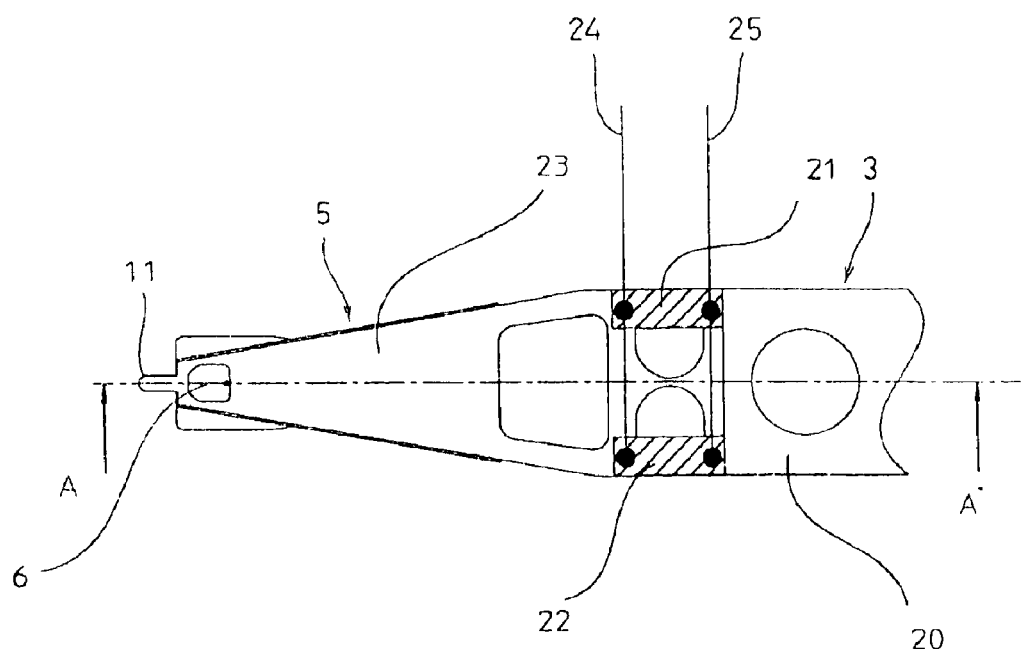
FIG. 3 is an enlarged plan view of a suspension in FIG. 2.
Figure 4:
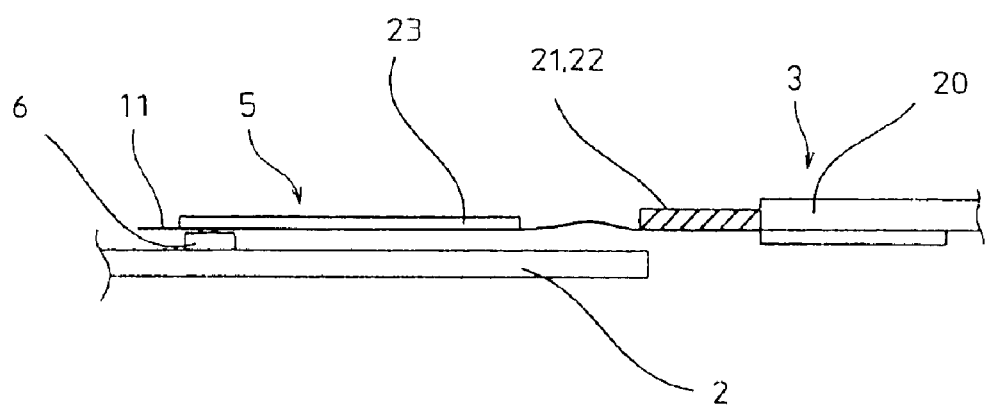
FIG. 4 is a cross section taken along A—A line in FIG. 3.
Figure 5:
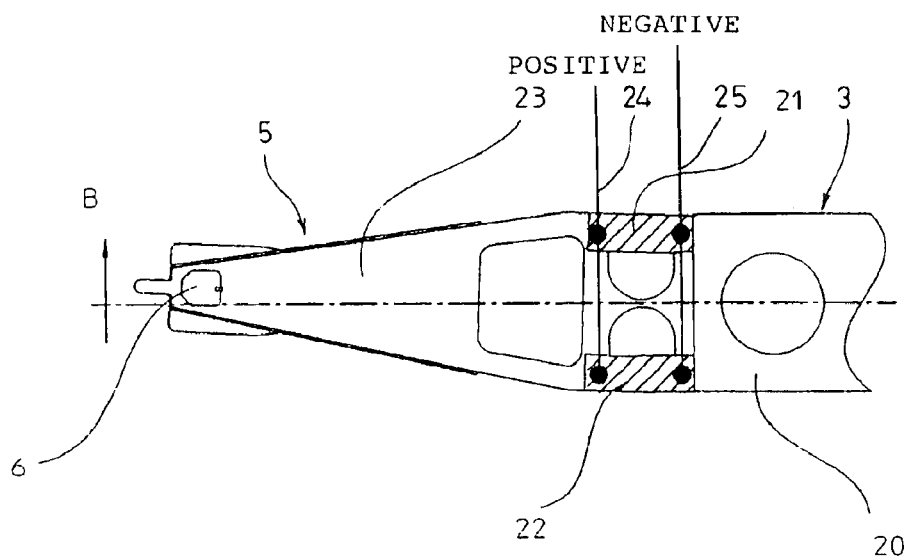
FIG. 5 shows a motion of a suspension in FIG. 3.
Figure 6:
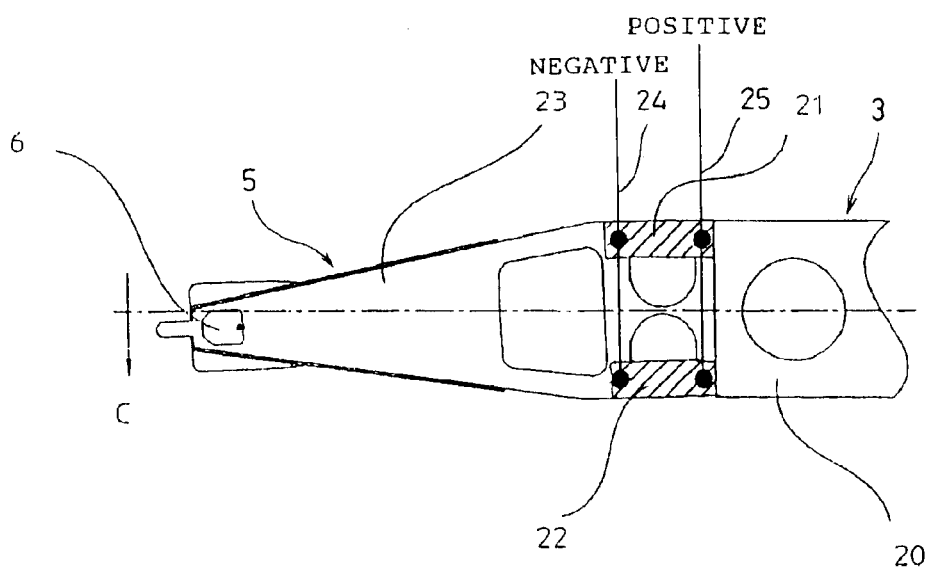
FIG. 6 shows a motion of the suspension in FIG. 3 in an opposite direction.

FIG. 2 is a plan view of the magnetic disk drive in operation. Next, the motion of the suspension 5 during operation shown in FIG. 2 will be described below. FIG. 3 is an enlarged plan view of the suspension 5. FIG. 4 is the A—A cross section of FIG. 3. An arm 20 that constitutes a portion of the actuator 3 and a load beam 23 are coupled together by piezoelectric elements 21 and 22 so as to constitute the micro-actuator. The tip of the load beam 23 has a head element 6. The disk 2 is shown with the abovementioned components in FIG. 4. The piezoelectric elements 21 and 22 are provided with a first electrode 24 and a second electrode 25, for example, when a positive voltage is applied to the first electrode 24 and a negative voltage is applied to the second electrode 25, the piezoelectric element 21 shrinks while the piezoelectric element 22 expands, as shown in FIG. 5. This causes the load beam 23 and the head element 6 to displace in the direction B as shown in FIG. 5. On the other hand, when a negative voltage is applied to the first electrode 24 and a positive voltage is applied to the second electrode 25, the piezoelectric element 21 expands while the piezoelectric element 22 shrinks, thus causing the load beam 23 and the head element 6 to displace in the direction C opposite to the direction shown in FIG. 5. FIG. 6 shows that case.

As shown in the above, the original objective of the piezoelectric elements 21 and 22 that constitute the micro-actuator is to cause the head element 6 to follow the high frequency fluctuations of the recording track in the radial direction of the disk that cannot be followed by the voice coil motor alone by applying voltages to the piezoelectric elements 21 and 22 when the disk device shown in FIG. 2 is in operation.

When a contact between the head element 6 and the disk 2 occurs for some reason while the head element 6 is floating over the disk 2 as shown in FIG. 4, the head element 6 develops oscillations because of its impact, and the oscillations are transmitted to the piezoelectric elements 21 and 22 through the load beam 23. Therefore, if the control circuit of the magnetic disk device is monitoring signals from the piezoelectric elements 21 and 22, the contact between the head element 6 and the disk 2 can be detected to cause the head to retreat from the data area and alert the host computer. If an effective countermeasure such as data backup is taken at this point, accidents such as loss of data due to head crash can be prevented.

(Embodiment 2)

Figure 7:
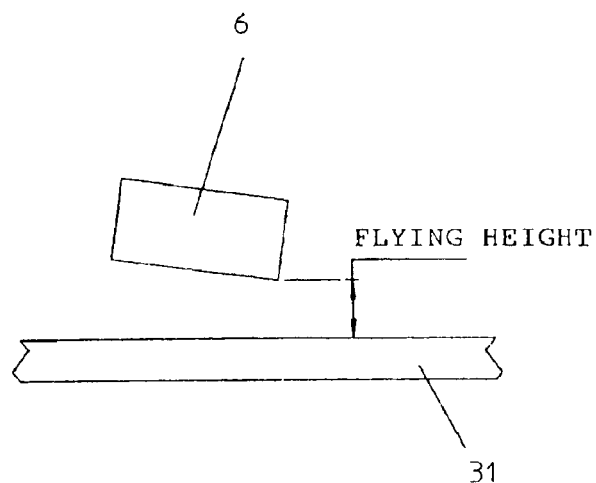
FIG. 7 shows a measurement of a flying height of a head in a flying height measuring device according to a second embodiment of the present invention.
Figure 8:
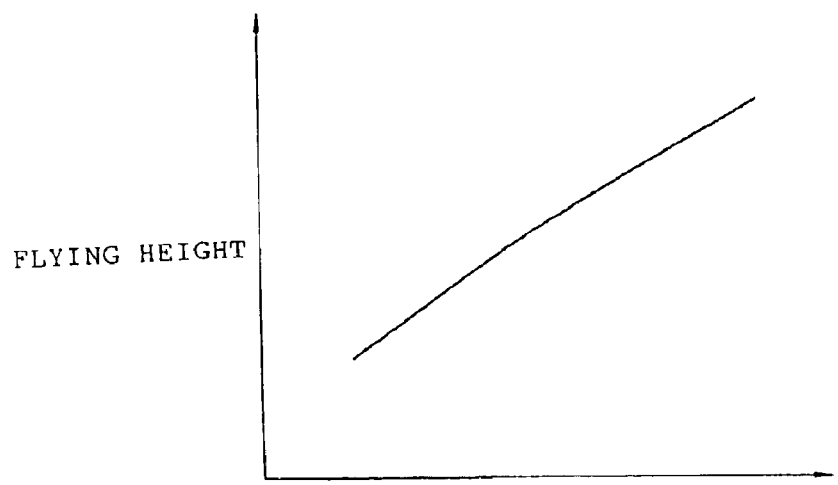
FIG. 8 shows an example of a measurement result by the measuring device in FIG. 7.
Figure 9:
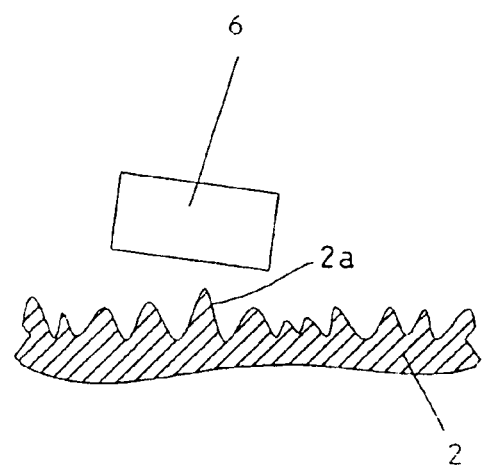
FIG. 9 is shows a floating condition of a head over an actual disk.

Next, the second embodiment is described using FIG. 7 through FIG. 9.

FIG. 7 shows a method for measuring the flying height of the head element 6 by means of the flying height measuring device. FIG. 7 shows a head element 6, which is used in the assembly of an actual magnetic disk device, and a glass disk 31 for the flying height measurement. The glass disk 31 for the flying height measurement has its surface finished ultra-flat. The first step here is to measure the flying height of the head element 6 by changing the rotating speed of the measuring disk 31 and prepare a graph as exemplified in FIG. 8.

Figure 10:
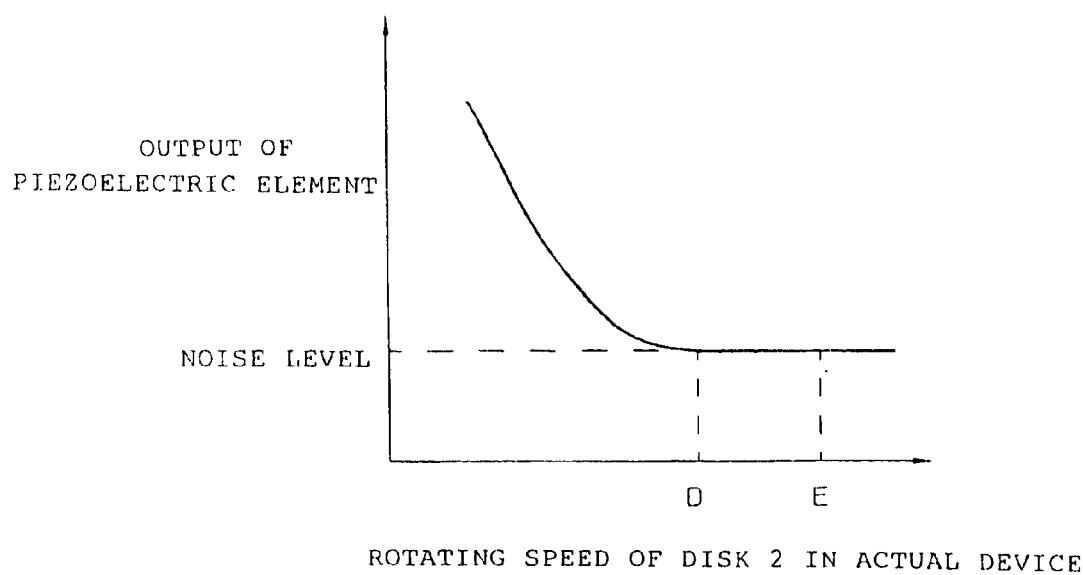
FIG. 10 shows an example of an output from a piezo-electric element in the condition shown in FIG. 9.

Next, this head element 6 is built into an actual magnetic disk device and floats at the normal rotating speed E of the operation. FIG. 9 exemplifies the floating condition. FIG. 9 shows the head element 6 being measured at its flying height in FIG. 7 and the surface 2 of the magnetic disk of the actual device. The surface 2 of the magnetic disk of the actual device has greater irregularity compared to the surface of the glass disk 31 used for measuring the flying height in FIG. 7. Such protrusions are indicated by 2a. Since the head element 6 is flying higher than the protrusions of the surface of the disk 2 under this condition, the piezoelectric elements 21 and 22 do not produce any output except noise level outputs. FIG. 10 shows such a condition. In FIG. 10, the vertical axis is the output of the piezoelectric element and the horizontal axis is the rotating speed of the disk 2 of the actual device. As the rotating speed decreases, the flying height of the head element 6 shown in FIG. 9 starts to decrease, eventually causing contact with the protrusions 2a of the surface of the disk 2. Let us call the disk speed at that point D. The rotating speed D can be determined by monitoring the outputs of the piezoelectric elements 21 and 22 while lowering the rotating speed of the disk 2. In FIG. 10, the rotating speed D is shown as the point where the outputs of the piezoelectric elements 21 and 22 start to rise from the noise level.

Figure 11:
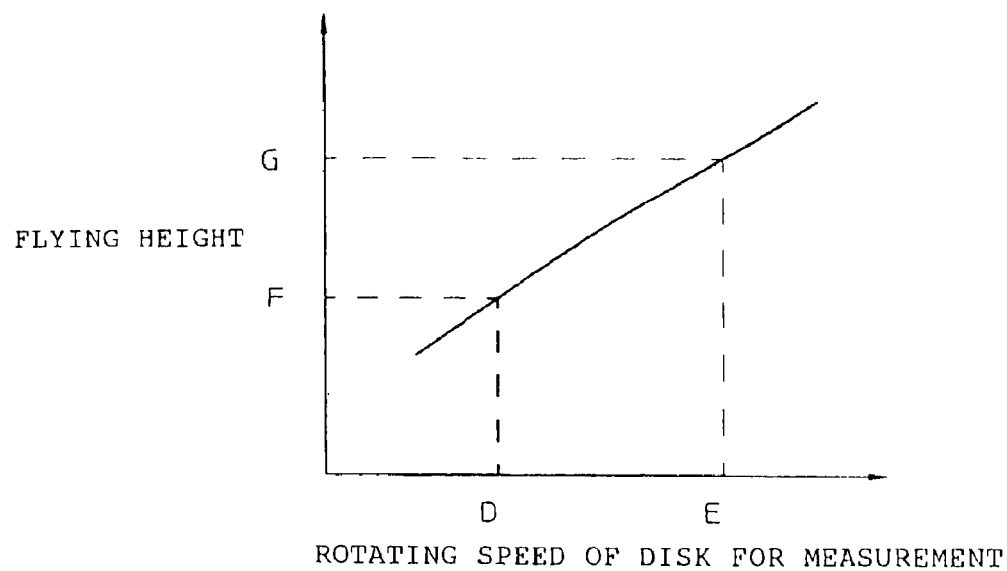
FIG. 11 is a diagram for obtaining a flying height of a head in an actual disk.

Lastly, the flying heights F and G that correspond to the rotating speeds D and E are determined from the previously prepared graph shown in FIG. 8. FIG. 11 shows the result of this step. This means that the value obtained by subtracting F from G is the flying height of the head element 6 in the actual device. The radial position of the head element 6 over the disk is assumed to be the same in the measurements shown in FIG. 8 and FIG. 10.

Since the flying height cannot be measured on disk 2 of the actual machine, the flying height of the actual machine is commonly determined by replacing the flat glass disk 31 with the flying height measured by the flying height measuring machine as mentioned in the above. The flying height test method according to the present invention uses the identical head element 6 for both tests shown in FIG. 7 and FIG. 9 and the head element 6 is built into the actual device. Moreover, no additional sensor needs to be added to the head in the measurement of FIG. 9 and the rotating speed D can be measured with the actual assembly, thus providing a measurement with a high reliability.

(Embodiment 3)

Figure 12:
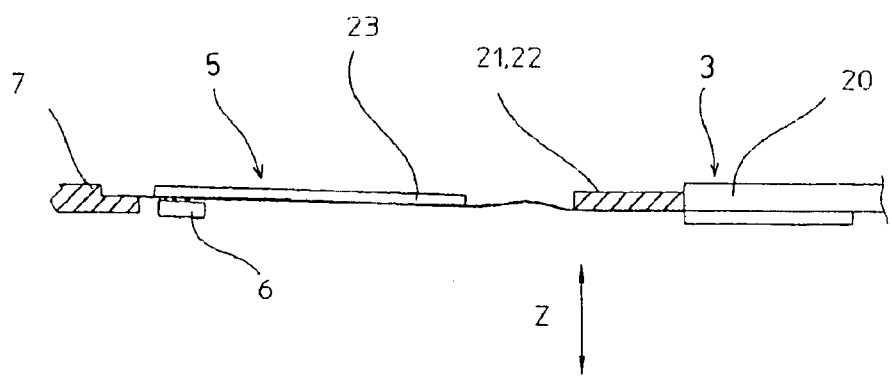
FIG. 12 is a cross section illustrating an influence of an external disturbance in a third embodiment of the present invention.

Next, the third embodiment of the present invention will be described below. The dynamic loading type magnetic disk normally has the head element 6 retreated from the surface of the disk 2 when it is not operating as it is shown in FIG. 1. FIG. 12 shows the H—H cross-section of FIG. 1. When a data recording or reproduction instruction is received from the host computer under this condition, the actuator 3 is swiveled in the counterclockwise direction in FIG. 2 to float the head element 6 over the surface of the disk 2. This is called the loading operation. However, if a disturbance, such as vibration, is applied to the magnetic disk device from the outside, the head element 6 may collide with the surface of the disk 2 to cause damage. Vibrations in the z direction shown in FIG. 12 can particularly cause significant damage. Therefore, it is desirable to confirm if there are any disturbances before starting the loading operation of the head element 6.

When vibrations in the Z direction are applied from the outside as shown in FIG. 12, the head element 6 and the load beam 23 can easily generate micro-oscillations, which are transmitted to the piezoelectric elements 21 and 22 to cause the piezoelectric elements 21 and 22 to generate voltages. Therefore, it is possible to check if there are any disturbances by monitoring the signals from the piezoelectric elements 21 and 22 prior to the loading operation. If any vibration disturbances are detected, the loading operation can be interrupted until the disturbances subside.

(Embodiment 4)

The fourth embodiment of the present invention will be described below referring to the accompanying drawings.

Figure 13:
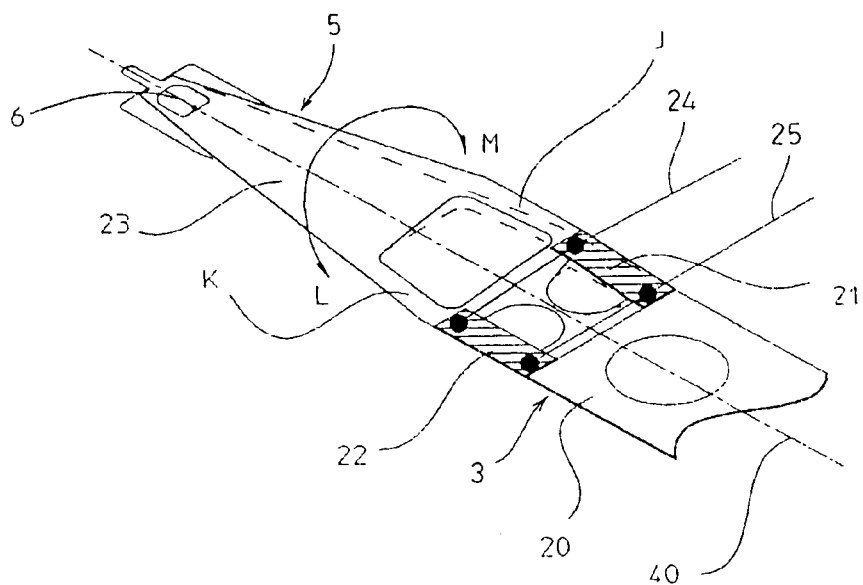
FIG. 13 is an enlarged perspective view of a suspension for explaining a fourth embodiment of the present invention.

FIG. 13 is an enlarged perspective view of the suspension 5 when the disk device shown in FIG. 2 is in operation. During the operation, a servo-circuit is feeding a current to the voice coil motor to swivel the arm 20 minutely left and right so that the head element 6 can precisely follow the recording track on the disk. However, there is a problem in that the servo-band cannot be increased due to mechanical resonance existing between the coil 9 and the head element 6 under this condition.

The typical resonance is the primary torsional resonance of the suspension 5. FIG. 13 shows this resonance condition. This resonance mode consists mainly of the torsional mode of the load beam 23 around its centerline 40. In FIG. 13, the load beam 23 is twisted in the direction of L, in which the portion J rises and the piezoelectric element 21 expands. In the next instance, the load beam 23 is twisted in the direction opposite to L, i.e., in the direction of M, the portion K rises and the piezoelectric 22 expands. This reciprocating cycle is repeated. When the voltage between the first electrode 24 and the second electrode 25 is monitored, it produces an AC voltage as shown by a solid line 41 in FIG. 14. The frequency of this alternating voltage is equal to the resonance frequency of the suspension 5 shown in FIG. 13.

If a voltage having an equal frequency to and an opposite phase to the solid line 41 as a broken line 42 is applied in this case, the piezoelectric elements 21 and 22 expand and shrink to cancel the twists of the load beam 23 of FIG. 13, thus lowering the gain of this resonance. Therefore, it provides an effect of allowing the servo-band to be raised.

(Embodiment 5)

Figure 15:
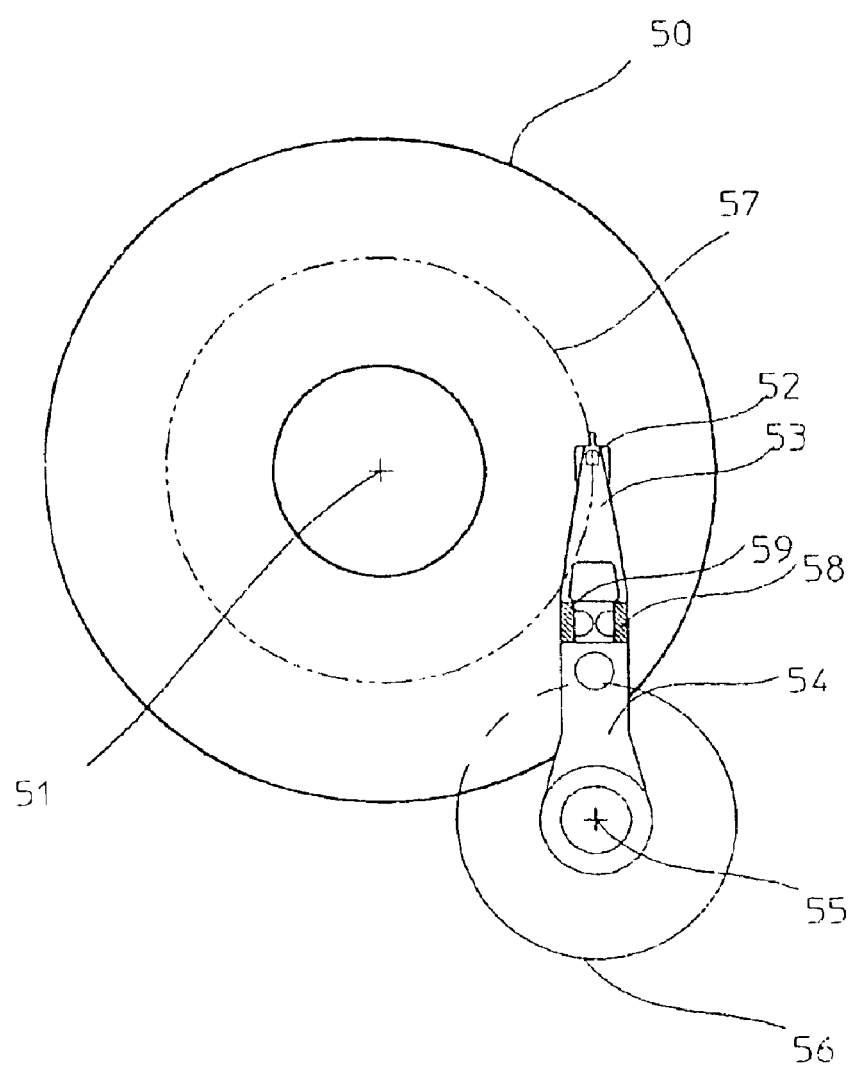
FIG. 15 is a plan view of a single plate servo-writer for explaining Embodiments 5 and 6 of the present invention.

The fifth embodiment of the present invention will be described below referring to FIG. 15. First, the single plate servo-writer will be described. FIG. 15 is a plan view showing the operating principle of the single plate servo-writing. A magnetic disk 50 is rotated, being fastened on the motor hub of the single plate servo-writer (not shown). The symbol 51 denotes the rotating center of the motor hub. A head element 52 is affixed to the tip of an arm 54 via a load beam 53 and floats over the disk 50 as the disk 50 rotates. A suspension 53 is equipped with piezoelectric elements 58 and 59 having the same constitutions as those shown in FIG. 3. On the other end of the arm 54 is connected to a swivel shaft 55 and the head element 52 can swivel around the swivel shaft 55. A positioning device 56, such as an optical encoder, is attached to the swivel shaft 55 so that the head element 52 can be accurately positioned on the specified position on the disk 50.

When the head element 52 is accurately held on one point in the radial direction on the disk 50, a servo-track 57 is written on the disk 50 using the head element 52. When the writing of one servo-track is completed, the head element 52 is moved minutely with the help of the optical encoder 56 to write the next servo-track in an identical manner. Repeating this process, a large number of multiple servo-tracks are written on the disk 50. The disk with many servo-tracks written thereon is removed from the single plate servo-writer and built into a magnetic disk device.

Since a single head element 52 is used to write servo-tracks on numerous disks 50 in the single plate servo-writer, the servo-writer becomes unable to write servo-tracks correctly once the head element 52 starts to make contact with the disks 50 during floating. If the servo-writing operation continues feeding new disks 50 without correcting the problem, a great many defective disks with improperly written servo-tracks will be produced and shipped.

In a case where the head element 52 and the disk 50 makes contact for some reason while the head element 52 is floating over the disk 50 as in FIG. 15, similar to a case described in the first embodiment using FIG. 4, the impact causes an oscillation of the head element 52 and that oscillation is transmitted to the piezoelectric elements 58 and 59 via the load beam 53. Therefore, if the control circuit of the single plate servo-writer is monitoring the signals from the piezoelectric elements 58 and 59, it can detect the contact between the head element 52 and the disk 50 and alert the host computer of the abnormality. By implementing an effective countermeasure such as replacement of the servo-signal writing head based on the alarm, the problem of producing many disks with improperly written servo-tracks can be prevented.

(Embodiment 6)

The sixth embodiment of the present invention will be described below. The servo-tracks written by the single plate servo-writer shall be the data for the head element 6 to position itself on the recording track when the magnetic disk device is ready to operate as shown in FIG. 2. Therefore, these servo-tracks should be recorded as close as possible to true circles on the disk 50 by the single plate servo-writer shown in FIG. 15.

However, since the positioning of the head element 52 by the single plate servo-writer relies on the optical encoder 56, the positioning accuracies of the components between the swivel shaft 55 and the head element 52 are dependant on the mechanical rigidities of the arm 54 and the load beam 53. The key element in rigidity from the swivel shaft 55 through the head element 52 is the primary torsional resonance of the suspension 53, which was described concerning the fourth embodiment shown in FIG. 13.

Figure 14:
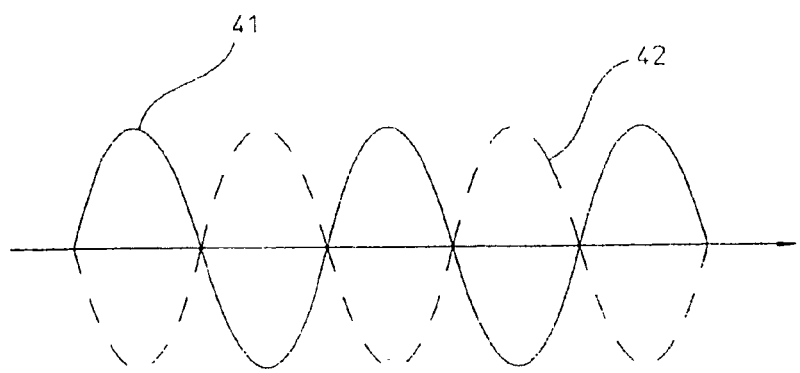
FIG. 14 illustrates a primary torsional resonance of the suspension shown in FIG. 13.

However, since this resonance problem is the same as in the fourth embodiment, it can be solved with the same method as in the fourth embodiment. In other words, as shown in FIG. 14 for the fourth embodiment, the gain of the primary torsional resonance of the load beam 53 can be reduced by applying to the piezoelectric elements 58 and 59 a voltage that cancels the voltages generated on the piezoelectric elements 58 and 59 due to the primary torsional resonance of the suspension 53.

(Embodiment 7)

The seventh embodiment of the present invention will be described referring to FIG. 16. First, the head tester will be described. Here, it is assumed that the head tester is a device for testing a head equipped with a micro-actuator.

Figure 16:
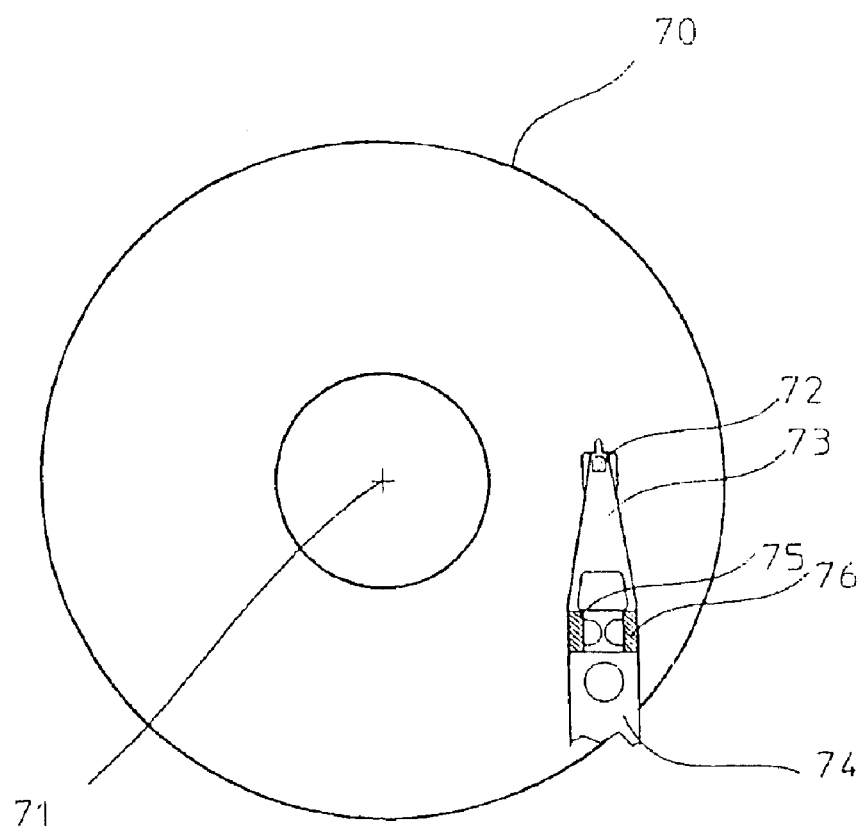
FIG. 16 is a plan view of a head tester for explaining Embodiment 7 of the present invention.

FIG. 16 is a plan view showing the operating principle of such a head tester. As the first step, a testing disk 70 is fastened on the motor hub of the head tester (not shown) and is rotated. The symbol 71 represents the rotation center of the motor hub. A head element 72 is affixed on an arm 74 via a load beam 73 and floats over the disk 70 as the disk 70 starts to rotate. Piezoelectric elements 75 and 76, which have a similar configuration to those shown in FIG. 3, are mounted on the load beam 73.

After the head element 72 is positioned accurately at one point in the radial direction over the disk 70, data recording and reproduction are executed on the disk 70 using this head element 72 to check if the head operates properly. The head herein means an assembly consisting of the head element 72, the load beam 73, and the piezoelectric elements 75 and 76. The head that has passed the test will be removed from the head tester and built into the disk device.

Since a single testing disk 70 is used to test numerous heads, once the head element 72 starts to make contact with the testing disk 70 for some reason it becomes unable to test the heads correctly due to damage to the testing disk caused by such contact. If the head testing process is continued simply changing the heads to be tested without correcting the problem, a great many defective heads will be produced and shipped.

If the head element 72 and the disk 70 makes contact for some reason while the head element 72 is floating over the disk 70 in FIG. 16, identical to that indicated in FIG. 4 of the first embodiment, the impact will cause oscillations of the head element 72 and the oscillations will be transmitted to the piezoelectric elements 75 and 76 via the load beam 73. Therefore, if the control circuit of the head tester is monitoring the signals from the piezoelectric elements 75 and 76, the contact between the head element 72 and the disk 70 can be detected to alert the host computer.

If an effective countermeasure such as the replacement of the head testing disk 70 is taken at this point, problems such as producing and shipping a great many defective heads can be prevented.

(Embodiment 8)

Figure 17:
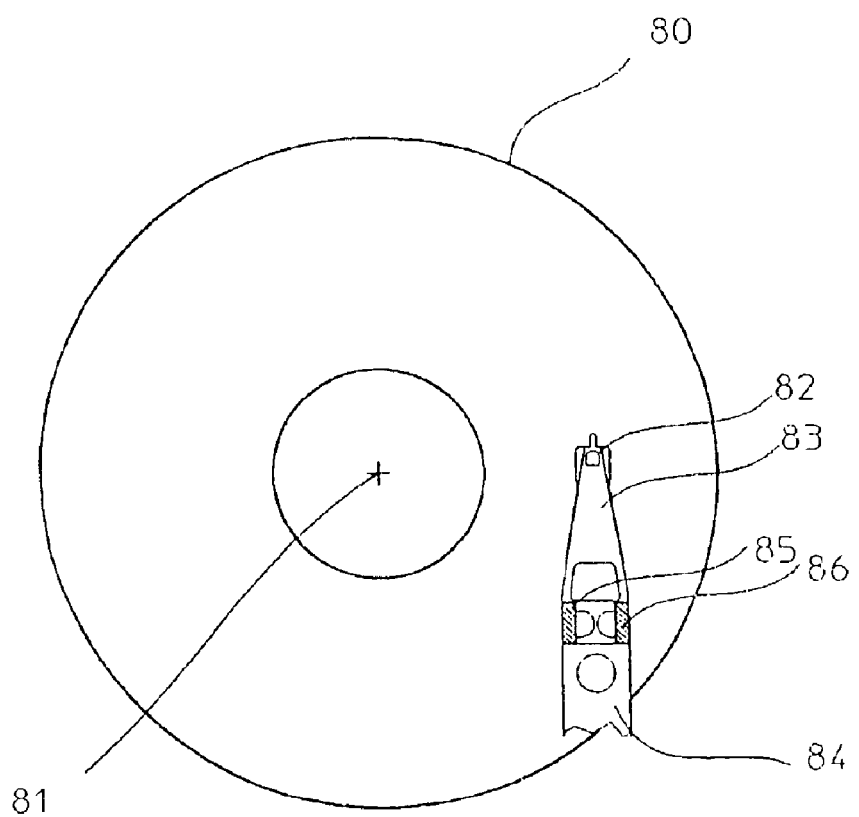
FIG. 17 is a plan view of a disk tester for explaining Embodiments 8 and 9 of the present invention.

The eighth embodiment of the present invention will be described referring to FIG. 17. First, the disk tester for testing numerous disks with a single testing head will be described. FIG. 17 is a plan view showing the operating principle of the disk tester. As the first step, a disk 80 is fastened on the motor hub of the disk tester (not shown) and is rotated. The symbol 81 represents the rotation center of the motor hub. A head element 82 is affixed on an arm 84 via a load beam 83 and floats over the disk 80 as the disk 80 starts to rotate. Piezoelectric elements 85 and 86, which have a similar configuration to those shown in FIG. 3, are mounted on the load beam 83.

With the above-described configuration, after the head element 82 is positioned accurately at one point in the radial direction over the disk 80, data recording and reproduction are executed on the disk 80 using this head element 82 to check if the characteristics of the surface of the disk 80 are normal. After completing this test over the entire surface of the disk, the disk that passed the test will be removed from the disk tester and built into the disk device.

Since a single testing head is used to test numerous disks, once the head element 82 starts to make contact with the disks 80 for some reason, it becomes unable to test the disks 80 correctly due to damage to the testing head caused by such contact. If the disk testing process is continued, simply changing the disk 80 to be tested without correcting the problem, a great many defective disks will be produced and shipped.

If the head element 82 and the disk 80 makes contact for some reason while the head element 82 is floating over the disk 80 in FIG. 17 identical to that indicated in FIG. 4 of the first embodiment, the impact will cause oscillations of the head element 82 and oscillations will be transmitted to the piezoelectric elements 85 and 86 via the load beam 83.

Therefore, if the control circuit of the head tester is monitoring the signals from the piezoelectric elements 85 and 86, the contact between the head element 82 and the disk 80 can be detected to alert the host computer. If an effective countermeasure such as replacement of the disk testing head is taken at this point, problems such as producing and shipping a great many defective disks can be prevented.

(Embodiment 9)

The ninth embodiment of the present invention will be described. The constitution of the ninth embodiment is identical to that of the eighth embodiment shown in FIG. 17.

The functions of the disk tester can be divided into two major categories, i.e., the gliding height test and the confirmation test. The confirmation test is to check the recording/reproduction characteristics of the disk as described in the eighth embodiment. On the other hand, the gliding height test is to check the height of the protrusions of the disk surface, which hitherto required a special head separate from the head for the confirmation test. This special head is used by mounting the piezoelectric element elastically on the arm of the head for the gliding height test as shown in, for example, JP-A-4-178920.

On the contrary, according to the present invention, the head equipped with micro-actuators can be used as a sensor for detecting protrusions on the disk as described in the second embodiment, so that the gliding height can be measured by the same method used for measuring the gliding height F from the rotating speed D in FIG. 11. Therefore, the disk tester with the constitution shown in FIG. 17 can be used for both the gliding height test and the confirmation test, thus simplifying the testing facilities.

What is claimed is:

1. A sensor system for a floating head disk device comprising:

a rotating disk a data recording area;

a suspension member comprising first and second portions coupled together;

a head element mounted on the first portion for floating over the data recording area of the disk to write data thereon or read data therefrom;

a first actuator for moving the second portion to move the head element over the data recording area of the disk;

a second actuator coupling the first and second portions and for precisely positioning the head element over the data recording area of the disk by moving the first portion in a radial direction of the disk; and a resonance canceller for canceling a torsional resonance generated between the first and second portions, by applying to the second actuator a signal having a phase opposite to a phase of a signal generated by the second actuator when the head element is floating.

2. A sensor system for a floating head disk device including a single-plate servo writer, said servo writer comprising:

a rotating disk having a data recording area;

a suspension member comprising first and second portions coupled together;

a head element mounted on the first portion for floating over a data recording area of the disk to write servo information thereon or read servo information therefrom;

a first actuator for moving the second portion to move the head element mounted on the first portion over the data recording area of the disk; and a second actuator coupling the first and second portions and for precisely positioning the head element over the data recording area of the disk by moving the first portion in the radial direction of the disk; and a resonance canceller for canceling a torsional resonance generated between the first and second portions, by applying to the second actuator a signal having a phase opposite to a phase of a signal generated by the second actuator when the head element is floating.

* * * * *